United States Patent [19]
Leger et al.

[11] Patent Number: 6,017,053
[45] Date of Patent: Jan. 25, 2000

[54] FOLDING WHEELBARROW

[75] Inventors: David Earl Leger; Mark Chesley McDonald, both of Chilliwack; David Roberts, Vancouver, all of Canada

[73] Assignee: FAB Developments Inc., Chilliwack, Canada

[21] Appl. No.: 08/727,236

[22] Filed: Oct. 8, 1996

[51] Int. Cl.[7] .................................................. B62B 1/18
[52] U.S. Cl. ....................................... 280/653; 280/47.31
[58] Field of Search .................................. 280/653, 654, 280/659, 47.3, 47.31, 645, 652

[56] References Cited

U.S. PATENT DOCUMENTS

| | | |
|---|---|---|
| 293,007 | 2/1884 | Goodwin . |
| 520,919 | 6/1894 | Garver . |
| 778,395 | 12/1904 | Baker ................................... 280/47.31 |
| 913,487 | 2/1909 | Fleischmann . |
| 1,145,523 | 7/1915 | Thompson . |
| 1,242,418 | 10/1917 | Booth . |
| 1,823,816 | 9/1931 | Chittenden . |
| 2,422,331 | 6/1947 | Bates ................................. 280/47.31 X |
| 2,471,462 | 5/1949 | Toth .......................................... 280/36 |
| 2,494,199 | 1/1950 | Provitola et al. ......................... 280/36 |
| 2,727,751 | 12/1955 | Souris .................................. 280/653 X |
| 2,800,335 | 7/1957 | Clapp ........................................ 280/42 |
| 3,552,760 | 1/1971 | Sine .......................................... 280/36 |
| 3,722,904 | 3/1973 | Puckett ..................................... 280/36 |
| 3,826,511 | 7/1974 | Frank ........................................ 280/36 |
| 4,261,590 | 4/1981 | Schupbach ........................... 280/47.31 |
| 4,471,996 | 9/1984 | Primeau ..................................... 298/3 |
| 4,781,396 | 11/1988 | King ....................................... 280/653 |
| 5,222,757 | 6/1993 | Magyar ................................... 280/653 |
| 5,607,174 | 3/1997 | Ambrogio ............................... 280/653 |

FOREIGN PATENT DOCUMENTS

| | | | |
|---|---|---|---|
| 8403122 | 5/1986 | Netherlands ........................... 280/653 |
| 2146591 | 4/1985 | United Kingdom ................... 280/653 |

*Primary Examiner*—Brian L. Johnson
*Assistant Examiner*—Michael Mar
*Attorney, Agent, or Firm*—Bull, Housser & Tupper

[57] ABSTRACT

A folding wheelbarrow is adjustable between erected and folded positions and comprises a pair of handle members, a pair of leg members, a wheel and a collapsible container of flexible sheet material. Forward portions of the handle members are hingedly connected together to form a kicker portion when erected, and rear portions of the handle members are laterally spaced apart for gripping. Forward portions of the leg members are hingedly connected together and located above the forward portions of the handle members when the wheelbarrow is erected, and rear portions of the leg members provide spaced apart legs to support the wheelbarrow. Each leg member is hinged to an adjacent arm member for rotation about a respective main hinge axis. The wheel is mounted for rotation about a transversely extending axle which is hingedly and slidably connected to the forward portions of the handle members. The collapsible container is made of a flexible sheet material and is located between the forward portions of the leg members and the rear portions of the handle member. A stiffening structure extends between the arm members and the leg members to limit relative movement therebetween about the main axis to stiffen the wheelbarrow when erected. A limiting structure limits rotation of the handle members about the handle axes.

20 Claims, 11 Drawing Sheets

FOLDING WHEELBARROW

BACKGROUND OF THE INVENTION

The invention relates to a folding wheelbarrow for light duty use in homeowner's yards and gardens, and for heavy duty use on building sites.

There are many patents disclosing folding wheelbarrows, but to the inventor's knowledge, none of these has been successfully commercially exploited for any length of time. Folding wheelbarrows as shown in the patents can be classified into two main classes, namely those with essentially rigid panel containers, and those with flexible fabric containers. Wheelbarrows having rigid panel containers usually comprise a plurality of essentially rigid sheet panels which are interconnected along edges to form a container mounted on a folding wheelbarrow frame. The rigid panels cannot be folded into a small space similarly to the frame and thus, when folded, occupy considerable space and thus do not provide a compact folding wheelbarrow. Examples of patents relating to folding wheelbarrows with rigid panel containers include U.S. Pat. No. 520,914 (Garver); U.S. Pat. No. 3,552,760 (Sine) and U.S. Pat. No. 3,722,904 (Puckett).

Folding wheelbarrows with flexible fabric containers are usually characterized by a relatively simple lightweight frame, from which a fabric container is suspended. The fabric container has an upper rim which is connected to the frame and thus, for a frame of normal height, volume of the container is limited because walls of the container do not extend upwardly above the frame. The resulting low volume of such wheelbarrows tend to limit their use to relatively light duty applications. Also, usually lower portions of the fabric containers are not connected elsewhere to the frame, and thus the containers are free to swing sideways, particularly when traversing uneven ground or sloping surfaces. Such swinging increases difficulty of controlling the wheelbarrow, particularly when carrying heavy loads. Thus, prior art wheelbarrows with flexible fabric containers would not be appropriate for heavy garden use or industrial applications. Examples of this type of wheelbarrow are found in U.S. Pat. No. 2,494,199 (Probitola et al); U.S. Pat. No. 3,826,511 (Frank) and U.S. Pat. No. 5,22,757 (Magyar).

In contrast with wheelbarrows having flexible containers, wheelbarrows having containers made of essentially rigid panels can have a larger volume similar to conventional non-folding wheelbarrows because upper portions of the panels can extend upwardly above the frame. Also, the rigid panels contribute to rigidity of the container which usually has lower portions securely attached to the frame to reduce relative movement. Thus, such wheelbarrows are generally more suitable for heavy duty use than those with flexible fabric containers, but as previously stated, containers made from rigid panels cannot be folded into a small space due to the relatively large size of the rigid panels. In addition, cost of producing a wheelbarrow with a container made of rigid panels tends to be relatively high compared with costs of manufacturing a folding wheelbarrow with a container of flexible fabric.

While some of the wheelbarrows with flexible containers might be appropriate for light duty use, none of this type of wheelbarrow known to the inventor has a "kicker" or wheel support which extends forwardly around the wheel and is useful for quickly dumping a load from a wheelbarrow. To use a kicker, the wheelbarrow is tilted forwardly by rocking the wheelbarrow until the kicker engages the ground and carries the weight of the wheelbarrow. Without a kicker or a temporary support of some kind, it is difficult or essentially impossible to dump a wheelbarrow by tilting the container forwardly over the wheel.

Also, many wheelbarrows, either non-folding or folding, have two legs which are laterally spaced apart at a distance less than width of the container, which can be termed a "narrow stance". Wheelbarrows with a narrow stance have a tendency to be unstable when supported on uneven ground, as an unevenly loaded container could generate an out of balance force which could tip or roll over the wheelbarrow.

Other folding, wheeled vehicles have been devised for specific applications, for example U.S. Pat. No. 913,487 (Fleischmann) discloses a folding baby carriage. The baby is supported on a hammock-type sling which is slung between front and rear portions of the carriage, with only light supports on side portions, and essentially no walls extending above base of the hammock. While such a carriage is possibly suitable for carrying infants, it has essentially no volume or capacity for gardening or utilitarian uses.

SUMMARY OF THE INVENTION

The invention reduces the difficulties and disadvantages of the prior art by providing a folding wheelbarrow with a collapsible container of flexible fabric which can be assembled to provide a container having a volume approximately equal to that of the conventional domestic wheelbarrow, and yet can be easily folded away to permit transportation or storage in a confined space. The wheelbarrow has a sturdy integral kicker to facilitate dumping of the load, and has additional stiffening means to reduce undesirable yielding or distortion of the frame under relatively high loads, and thus is suitable for heavier use than some prior art folding wheelbarrows. In addition, the invention provides a folding wheelbarrow which has a relatively wide stance, that is a stance in which spacing between the legs of the wheelbarrow is no less than maximum width of the container, thus increasing stability when on uneven ground, when compared with prior art narrow stance wheelbarrows. Thus, the wheelbarrow of the present invention can be used very similarly to a rigid or non-folding wheelbarrow for both tipping loads forwardly over the front wheel, as well as carrying relatively heavy loads in uneven terrain, commonly found in backyard gardens or on building sites. The use of a flexible container not only facilitates folding, but also reduces costs and folded size when compared with a prior art folding wheelbarrow having a container of interconnected rigid panels.

A folding wheelbarrow according to the invention is adjustable between erected and folded positions and comprises a pair of handle members, a pair of leg members, a wheel and a collapsible container made of a flexible sheet material. The handle members have respective forward and rear portions, the forward portions cooperating with each other to form a kicker portion when the wheelbarrow is erected. The rear portions are laterally spaced apart when the wheelbarrow is erected for gripping with hands. The leg members have forward and rear portions, the forward portions of the leg members cooperating with each other and being located generally above the forward portions of the handle members when the wheelbarrow is erected. The rear portions of the leg members provide a pair of laterally spaced apart legs to support the erected wheelbarrow, each leg member being hinged to a respective arm member for rotation about a respective main hinge axis. The wheel is mounted for rotation about a transversely extending wheel axle, and is located adjacent and rearwardly of the kicker portion. The collapsible container is located between the forward portions of the leg members and the rear portions of the handle members.

The wheelbarrow further comprises stiffening means for stiffening the wheelbarrow when erected, the stiffening means extending between the arm members and the leg members to limit relative movement therebetween. The stiffening means comprise a first set of flexible tension links which extend longitudinally between the rear portions of the handle members and the front portions of the leg members on each side of the wheelbarrow. The stiffening means further comprise a second set of flexible tension links which extend diagonally and transversely between the handle members and the leg members on opposite sides of the wheelbarrow. The container has an upper rim and the first set of flexible tension links cooperate with portions of the rim of the container to support the rim against deflection.

The forward portions of the handle members are hingedly connected together for rotation about a lower hinge joint. The forward portions of the leg members are hingedly connected together for rotation about an upper hinge joint. The upper and lower hinge joints have respective hinge pins which are generally aligned with each other when the wheelbarrow is folded. The axle of the wheel is hingedly and slidably connected to forward portions of respective handle members to permit relative movement between each handle member and the axle. The wheelbarrow further comprises limiting means for limiting outwards movement of the handle members so as to limit maximum spacing between the handle members when the wheelbarrow is erected. The wheelbarrow further comprises a reaction means to react against the said outwards movement of the handle members. The reaction means cooperates with the handle members to generate an inwardly directed reaction force on the limiting means when the wheelbarrow is erected so that the limiting means are locked against movement by the inwardly directed force from the reaction means.

A detailed disclosure following, related to drawings, describes a preferred embodiment of the invention which is capable of expression in structure other than that particularly described and illustrated.

DETAILED DESCRIPTION

FIGS. 1 through 4

Figure 1:
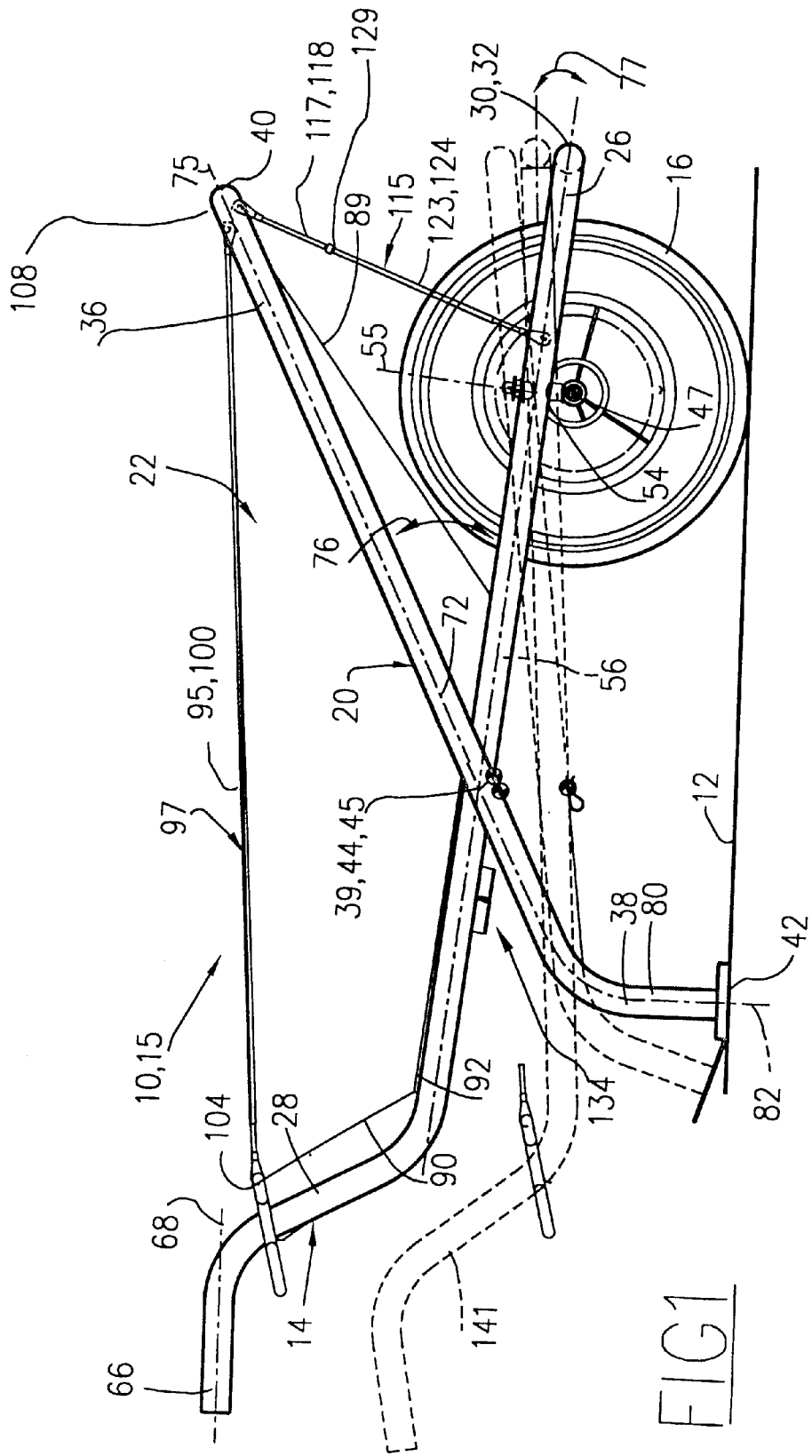
FIG. 1 is a simplified side elevation of a folding wheelbarrow according to the invention with a frame and a collapsible flexible container thereof shown erected in full outline, and with some portions shown in broken outline in fully folded positions thereof.

A wheelbarrow 10 according to the invention is shown erected and supported on level ground 12 and has a vertical longitudinal plane of symmetry 11. The wheelbarrow has a pair of handle members, namely left hand and right hand handle members 13 and 14, and a wheel 16 mounted for rotation with respect to the handle members. The wheelbarrow also has a pair of leg members, namely left hand and right hand leg members 19 and 20, and a flexible collapsible container 22 made of pliable sheet material as will be described. The members 13, 14, 19 and 20 are preferably metal tubes which provide portions of a light and strong collapsible frame 15 for the wheelbarrow.

The handle members 13 and 14 have respective forward portions 25 and 26, and respective rear portions 27 and 28. The forward portions 25 and 26 are curved inwardly as shown and are hingedly connected together with a hinge pin 24 at a lower hinge joint 30 (see FIGS. 6 and 7) and form a kicker portion 32 which extends partially and forwardly around the wheel 16 as shown and functions as a conventional kicker of a conventional rigid wheelbarrow. The rear portions 27 and 28 are laterally spaced apart when the wheelbarrow is erected for gripping with an operator's hands, as in a conventional wheelbarrow.

The leg members 19 and 20 have respective forward portions 35 and 36, and respective rear portions 37 and 38. Outer ends of the forward portions 35 and 36 of the leg members are similarly hingedly connected together with a hinge pin 31 at an upper hinge joint 40 (see FIGS. 6 and 7). The pin 31 is located generally above the pin 24 of the lower hinge joint 30, and when the wheelbarrow is folded, can be generally axially aligned with the pin 24. The rear portions 37 and 38 of the leg members curve downwardly to provide a pair of laterally spaced apart generally vertical legs to support the erected wheelbarrow. Outer ends of the rear portions 37 and 38 have foot pads 41 and 42 respectively to decrease bearing loads on the ground from the ends of the legs and to assist in erection of the wheelbarrow as will be described with reference to FIGS. 12 and 13.

The leg members 19 and 20 are located outwardly of and hinged to adjacent handle members 13 and 14 respectively for rotation about respective hinge pins 43 and 44. The hinge pins 43 and 44 are received in four complementary hinge sleeves 39, which are welded in aligned pairs to deformed lower portions of the members 13, 14, 19 and 20, as described with reference to FIG. 14. When the wheelbarrow is erected as in FIG. 2, the pins 43 and 44 are disposed on a transversely extending main hinge axis 45 and thus are aligned with each other. The main axis 45 provides a first hinge axis about which the members 13, 14, 19 and 20 of the frame 15 can rotate between erected and folded positions, as shown in FIGS. 1, 3, 12 and 13. The right hand members and right hand leg members are shown in broken outline at 14.1 and 20.1 in retracted or folded positions thereof as will be described with reference to FIGS. 12 and 13.

Figure 3:
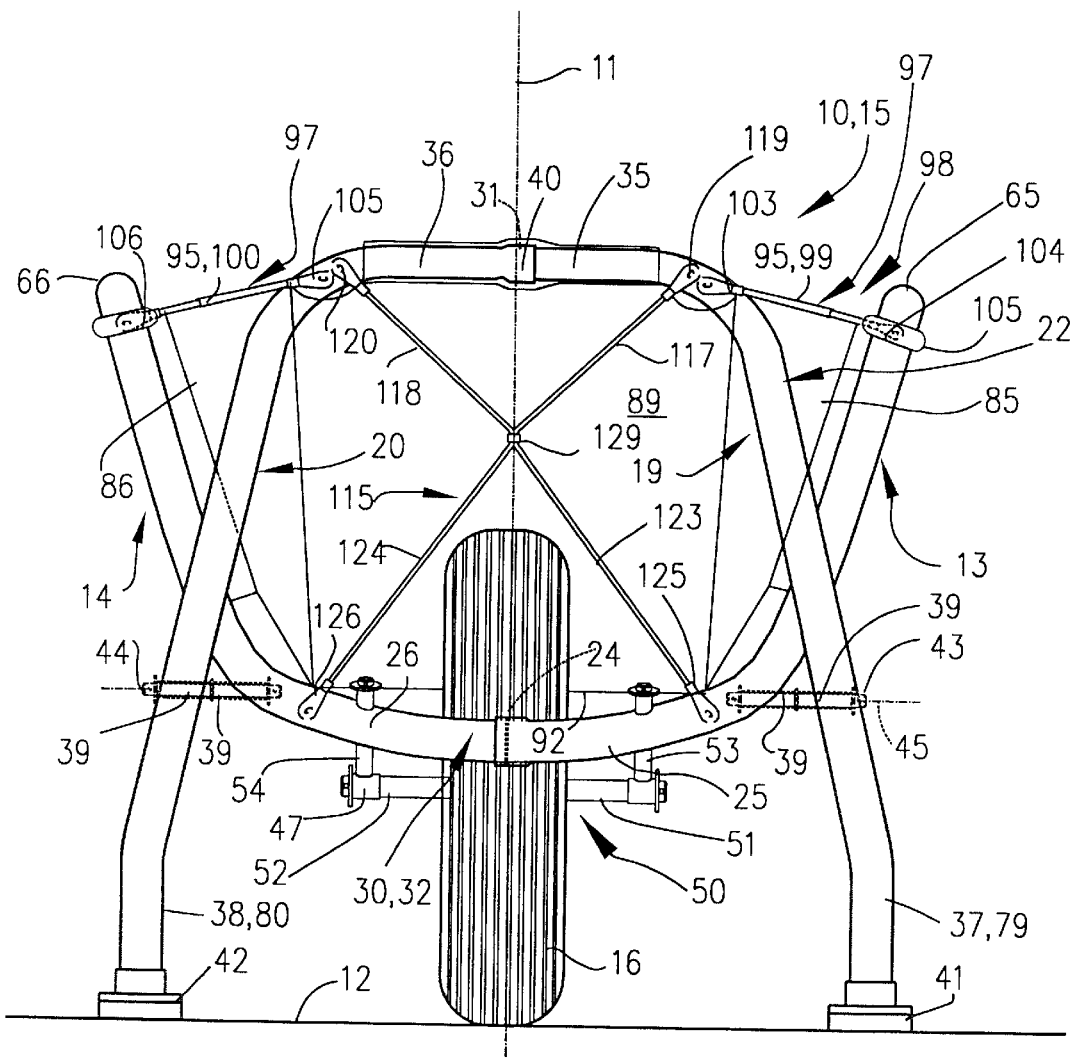
FIG. 3 is a simplified front elevation of the invention shown erected.

The wheelbarrow 10 has a transversely extending wheel axle 47 extending between the forward portions 25 and 26 of the handle members, and the wheel 16 is mounted for rotation about the axle. The axle is positioned so that the wheel is located adjacent and rearwardly of the kicker portion 32 and is selected so that the kicker portion will contact the ground to move the wheel off the ground when a load is being dumped forwardly from the container of the wheelbarrow following conventional practise. As best seen in FIG. 3, the axle 47 comprises a central portion 50 journalling the wheel, and left hand and right hand axle end portions 51 and 52 extending outwardly from the central portion and slidably received in respective left hand and right hand axle supports 53 and 54. The supports 53 and 54 are described in greater detail with reference to FIGS. 8 through 11, and extend generally vertically upwardly from the axle 47 to cooperate with the forward portions 25 and 26, and are disposed parallel to each other when viewed longitudinally of the wheelbarrow as seen in FIG. 3. The axle supports 53 and 54 are disposed generally within an axle plane 55 which is disposed perpendicularly to a first plane 56 containing forward portions of the handle members, the planes 55 and 56 being shown as broken lines in FIG. 1.

The forward portions 25 and 26 of the handle members have undesignated opening provided with journals to receive and journal the respective axle supports 53 and 54 to permit limited rotation of each handle member relative to the respective axle end portion which occurs when the frame folds about the hinge joints 30 and 40. This hinging is in addition to the first hinging as previously described that occurs about the first or main hinge axis 45. The axle supports 53 and 54 also slide laterally relative to the axle 47 as will be described in greater detail with reference to FIGS. 8 through 11. Thus, the axle of the wheel is hingedly and slidably connected to forward portions of the respective handle members to permit limited rotation and sliding of each handle member with respect to the axle.

The handle members 13 and 14 also comprise intermediate portions 61 and 62 respectively which are disposed between the respective forward and rear portions thereof and to which are welded the sleeves 39 of the hinge pins 43 and 44. The intermediate portions are generally co-planar with the forward portions 25 and 26 and thus are disposed within the first plane 56 of the handle members. The rear portions 27 and 28 of the left hand and right hand handle portions are formed into approximate oblique crank shapes which resemble shallow Z-shapes to provide respective grip portions 65 and 66 disposed above the load, thus increasing stability. The grip portions are disposed within a grip plane 68 which is located above the first plane 56 and inclined thereto to be at a convenient height above the ground for gripping by the operator as with some conventional light duty wheelbarrows. This contrasts with heavy duty wheelbarrows having straight arms, which provide low hand grip positions with the load located above the hand grips which is thus more unstable.

The leg members 19 and 20 also comprise intermediate portions 71 and 72 respectively, which are disposed between the respective forward and rear portions thereof and to which are welded the sleeves 39 to receive the hinge pins 43 and 44. The intermediate portions 71 and 72 and the forward portions 35 and 36 of the leg members are disposed within a second plane 75 of the leg members, shown as a broken line in FIG. 1. When the wheelbarrow is erected, the planes 56 and 75 (i.e. the intermediate portions of the handle members and leg members) are disposed at an erected angle 76 to each other, and when the wheelbarrow is folded, the planes 56 and 75 are disposed at a folded angle 77, the angles 76 and 77 being about 35 degrees and 3 degrees respectively although the angles are not critical.

The rear portions 37 and 38 of the leg members 19 and 20 are formed into a shallow L-shape to provide downwardly extending foot portions 79 and 80. The foot portions are disposed within a foot plane 82 which extends beneath the second plane 75 and is disposed generally perpendicularly to the ground. The grip plane 68 is generally perpendicular to the foot plane 82 when the wheelbarrow is viewed laterally as in FIG. 1. The grip portions 65 and 66 on each side of the wheelbarrow are located generally vertically above the respective foot portions 79 and 80 when the wheelbarrow is viewed axially as in FIG. 3. It can be seen that the foot pads 41 and 42 are spaced apart almost as widely as the grip portions to provide a "wide stance" wheelbarrow which has far greater lateral stability than a narrow stance heavy duty wheelbarrow of the prior art. A wide stance wheelbarrow also facilitates dumping a load over the kicker by permitting the operator's torso to push the container in the final stage of dumping.

Figure 4:
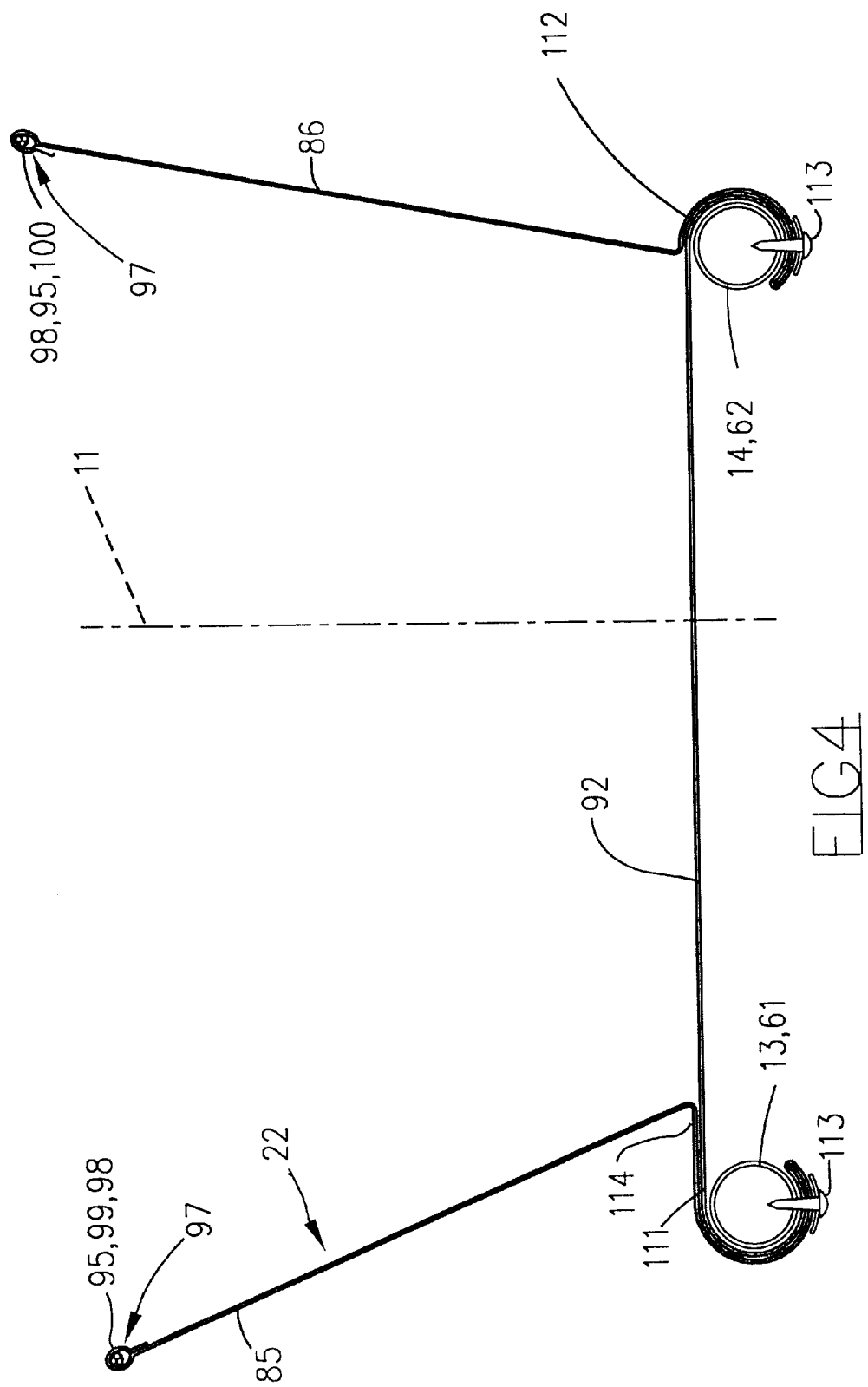
FIG. 4 is a simplified fragmented staggered transverse section of the flexible container of the invention as seen on line 4—4 of FIG. 2, some dimensions being exaggerated for clarity and portions of handle members being shown.

Referring to FIGS. 1 and 4, the flexible container 22 extends longitudinally between the forward portions of the leg members and the rear portions of the handle members and laterally between left and right hand handle members and leg members. The container is made of a tough but flexible sheet material, such as a reinforced, impermeable, polymer coated (PVC), synthetic fibre (Nylon) woven material of about 28 oz per square yard, sold under the name Shelterite XR-5, a trade-mark of Seaman Corporation of Ohio, U.S.A. Such material can be joined together or bonded using ultrasonic welding techniques, although other material which can be bonded using adhesives can be substituted. Alternatively, the material can be sewn together or connected using other fastening means. The material should be sufficiently flexible to permit folding of the wheelbarrow under normal temperatures, and yet be sufficiently tough to withstand loading with normal garden material, such as soil, rocks, garden refuse, etc. In addition, the material should be sufficiently abrasion resistant to withstand grating with a shovel, and repeated, highly loaded abrading against portions of the wheelbarrow frame.

The container has left hand and right hand side panels 85 and 86 respectively, and forward and rear panels 89 and 90, side edges of adjacent panels being secured to each other at corners of the container. A bottom panel 92 interconnects bottom edges of the panels of the container to form a polygonal prism shape which resembles a conventional domestic wheelbarrow container or box. The container 22 also has a volume generally similar to a prior art wheel barrow for example approximately 5–6 cubic feet. The container has an upper rim 95 which extends therearound along upper edges of the panels 85, 86, 89 and 90 which are generally co-planar when the container is unloaded. The rim interconnects the forward portions 35 and 36 of the leg members and extends rearwardly towards the rear portions 27 and 28 of the handle members.

The wheelbarrow also has a plurality of flexible tension links, that is lengths of flexible light cable with end connectors for securing to structure. The links cooperate with the handle members and leg members to limit relative movement therebetween so as to stiffen the wheelbarrow when erected and to serve as stiffening means for the folding member structure of the wheelbarrow as will be described. The cables also support upper edges of the container and are relatively light, flexible braided steel cables, having a working strength of approximately 500 pounds. The cables are sufficiently strong to stiffen the erected frame and yet are sufficiently flexible to bend easily to facilitate folding of the wheelbarrow. The stiffening means comprise first and second sets of flexible tension links which serve specific purposes as follows.

As best seen in FIGS. 3 and 4, the first set of flexible tension links is designated 97 and comprises left hand and right hand longitudinal link portions 99 and 100 which extend longitudinally between the handle member and leg member on respective sides of the wheelbarrow. Thus, as best seen in FIG. 3, the left hand longitudinal link portion 99 has a forward end 103 secured to the forward portion 35 of the left hand leg portion, and a rear end 104 slidably cooperating with the rear portion 27 of the left hand handle member 13. Similarly, the right hand longitudinal link portion 100 extends between the forward end 105 thereof and a rear end 106 thereof in a similar manner. The upper edges of the side panels 85 and 86 are provided with sleeves to define portions of the upper rim 95 and to receive the longitudinal link portions 99 and 100 respectively passing therethrough to support the side edges against deflection. Thus, the first set 97 also cooperates with portions of the rim 95 of the container to support the rim against deflection. As will be described with reference to FIG. 5, the rear end 104 is releasably connected to a catch on the rear portion 27 to permit attachment and release of the rear end of the cable when erecting and folding the apparatus.

The upper edge of the rear panel 90 has a rear sleeve 107 extending therealong to reinforce the rim 95 to assist in supporting the rear edge against deflection. The sleeve terminates at the link portions 99 and 100 and thus is supported at opposite ends by cables under tension. In one alternative embodiment, the first set of flexible tension links 97 could further include a transverse link portion, not shown, cooperating with a rear sleeve 107 of the rear panel 90 and extending between portions of the longitudinal link portions 99 and 100 adjacent the ends 104 and 106 thereof. Alternatively, the ends of the transverse link portion could be connected directly to positions adjacent rear portions of the handle members.

As previously stated, the forward portions 35 and 36 of the leg members are hingedly connected together at the hinge portion 40 and thus, when the wheelbarrow is erected, form a horizontally disposed support located above the wheel adjacent the rim 95 of the upper edge of the forward panel 89. The upper edge of the forward panel has a forward sleeve 108 extending therealong and accepting the forward portions of the leg members passing therethrough. Thus, the forward sleeve cooperates with the leg members and a forward portion of the container to support the forward portion of the container against deflection.

Thus, it can be seen that the four panels 85, 86, 89 and 90 have upper edges defining the upper rim 95 of the container 22 and at least three of the upper edges are supported against deflection and maintain the upper edges of the container relatively tight to support material therein.

As best seen in FIG. 4, the container 22 also has left hand and right hand bottom corner connectors 111 and 112 located adjacent the bottom panel 92 of the container and extending longitudinally along lower edges of the adjacent respective side panels 85 and 86. The bottom corner connectors 111 and 112 are folded flap portions of extensions of the container side panels and the bottom panel which are bonded together for strength and to maintain shape of the container. The connectors 111 and 112 are secured to the intermediate portions 61 and 62 of the left hand and right hand handle members by threaded fasteners 113 passing through the connectors 111 and 112 into the members, and thus connect lower edges of the side panels and the bottom panel to the handle members to restrain relative lateral movement between the container and the handle members. To provide additional "fullness" in the fabric of the container to permit complete folding of the wheelbarrow as will be described, the bottom corner connectors 112 and 113 are tapered forwardly from a broad flap portion 114 adjacent the rear panel 90 to an essentially direct connection of the side panel to the handle member adjacent the forward panel 89. Dimensions of the panel and connectors are selected so that the bottom panel is taut when the wheelbarrow is erected.

Thus, in summary, the container is restrained against movement relative to the frame 15 of the wheelbarrow by being restrained securely at the upper rim of the three edges of the panels, and also at the two lower side edges of the side panels and the bottom panel. If necessary, an additional transverse stiffener could be provided extending between a rear edge of the bottom panel 92 and a lower edge of the rear panel 90, but this is probably unnecessary due to closeness of the rear sleeve 107 and the link portions which provide considerable support. Thus, it can be seen that the bottom corner connectors 111 and 112 cooperate with the handle members and the bottom panel to restrict relative movement between the container and the handle members. This restriction is particularly important when material is being dumped from the wheelbarrow container, or the wheelbarrow is traversing a side hill and is held so that the grip portions are at different elevations with respect to each other.

The second set of flexible tension link means is designated 115 and extends diagonally and transversely between forward portions 25 and 26 of the handle members and forward portions 35 and 36 of the leg members to limit relative lateral and vertical movement therebetween. The second set 115 comprises left hand and right hand upper link portions 117 and 118 which have respective upper ends 119 and 120 connected to left hand and right hand forward portions 35 and 36 of the leg members. The second set further comprises left hand and right hand lower link portions 123 and 124 having lower ends 125 and 126 connected to left hand and right hand forward portions 25 and 26 of the handle portions. Lower ends of the upper link portions, and upper ends of the lower link portions are connected together at an intersection 129, thus forming an X-shape, as best seen shown in FIG. 3. Clearly, the four link portions can be made from two separate lengths of cable and connected together at the intersection as desired. It can be seen that the link portions extend diagonally between the handle members and the leg members, and thus form a series of triangles which, when the link portions are tensioned, essentially eliminate relative vertical and lateral movement between the forward end portions of the handle members and leg members. Limiting vertical movement between the forward portions of the handle members and leg members prevents relative rotation between the handle members and the leg members about the main hinge axis 45. Limiting lateral movement between the forward portions reduces sideways swaying of the wheelbarrow which is particularly important when the wheelbarrow is traversing a side hill and one grip portion is raised above the other grip portion so as to produce asymmetrical diagonal loading on the container 22 and thus on the framework. Lengths of the link portions 99, 100, 117, 118, 123 and 124 are critical and are made from essentially inelastic steel cable to provide sufficient rigidity for the frame 15.

Figure 2:
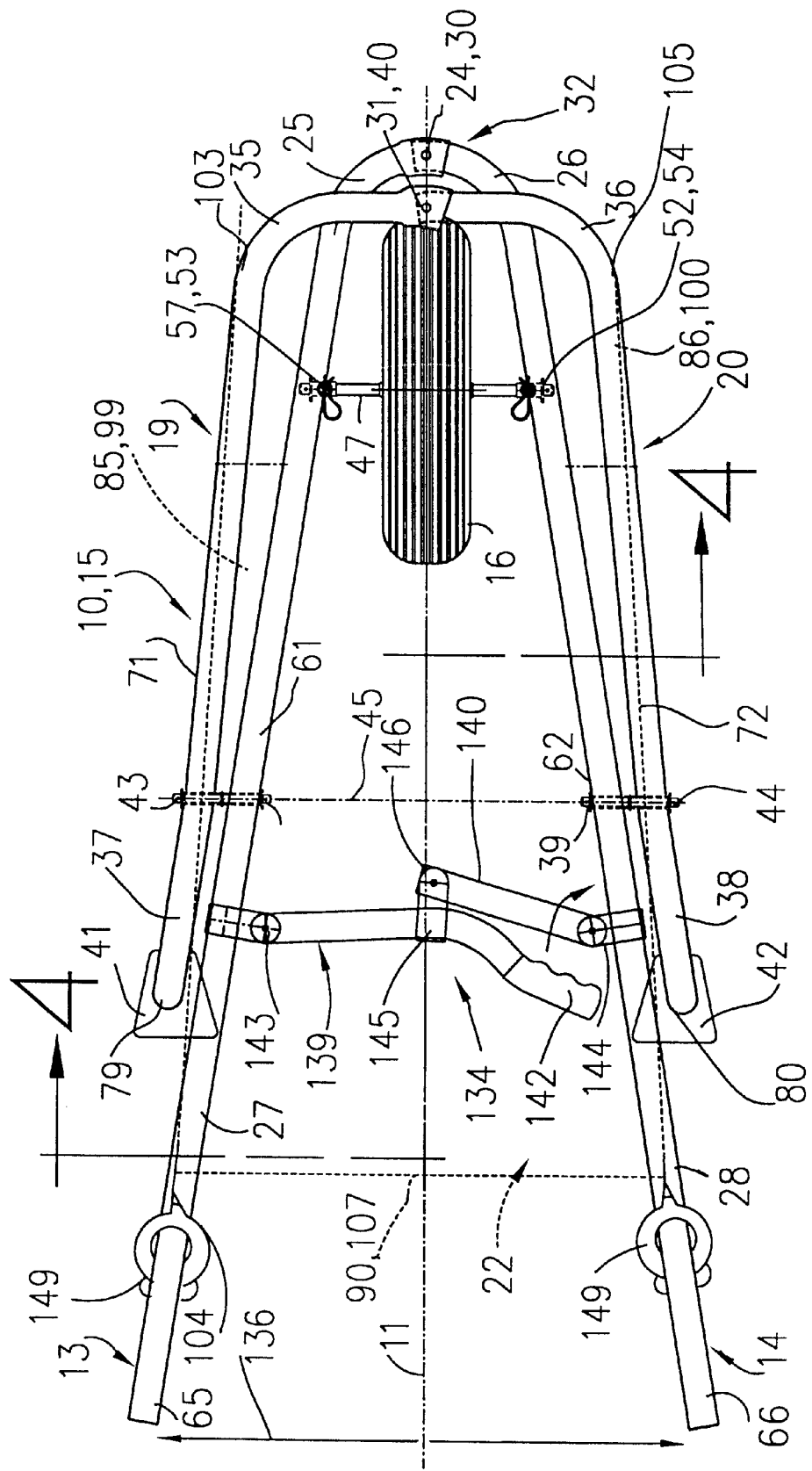
FIG. 2 is a simplified top plan of the invention, showing the frame erected, outline of the flexible container being shown.

As best seen in FIG. 2, the wheelbarrow further comprises a latching structure to latch the wheelbarrow in the erected position to prevent inadvertent folding of the wheelbarrow. The latching structure comprises a limiting means 134 for limiting outwards movement of the handle members outwards movement, i.e. maximum spacing 136 between the handle members 13 and 14 when the handle members rotate about the lower hinge joint 30 as the wheelbarrow is erected. The latching structure also comprises a reaction means to react against the outwards movement as will be described so as to lock the limiting means to hold the handle members in the erected position. The spacing 136 defines transverse measurement between the grip portion 65 and 66, but this is merely representative and an equivalent measurement can be taken at other locations. The limiting means comprise left hand and right hand rigid limiting links or struts 139 and 140 which have respective outer ends 143 and 144 hingedly connected to undesignated brackets extending inwardly of the left hand and right hand handle members respectively. The link 139 is longer than the link 140 and has a handle 142 at a free end thereof and a bracket 145 at an intermediate position thereof. The link 140 has an inner end hinged relative to the bracket 145 for limited rotation about a link hinge 146 disposed generally adjacent the longitudinal plane 11 of the wheelbarrow. Preferably, the limiting means should be mounted on the handle members as far aft as possible without causing interference with an operator's legs while walking. Clearly, the further aft the limiting means is fitted, the greater its effect on stiffness of the handle members.

It is important that the handle members and the leg members are locked when the wheelbarrow is erected and do not unintentionally fold from the erected position. This is attained by providing an over-centring effect of the limiting links 139 and 140, which together with the said reaction means, can hold the limiting links in an over-centred position as shown in full outline in FIG. 2 (and FIG. 6). The links 139 and 140 rotate forwardly from a folded position (FIG. 6) per undesignated arrows to attain the over-centred position, and pass through a generally aligned intermediate position in which the spacing 136 is at a maximum, whereas in the over-centred position as shown, the spacing 136 is somewhat less. A first portion of the reaction means is provided by using tension in the bottom panel of the container which assists in holding the container taut as well as providing one reaction means to hold the links in the over-centred position as above described. In this reaction means, the bottom panel has opposite sides cooperating with the adjacent handle members through the bottom corner connectors 111 and 112, so that the bottom panel is still taut when the limiting links are over-centred due to slight resilience in the container. Thus, the bottom panel of the container is subjected to additional tension as the limiting links pass through the over-centred position and resilience and residual tension in the container and associated structure applies a similar inwardly directed force which holds the limiting links locked in the over-centred position and maintains the members of the frame in the erected positions thereof.

Thus, as the links 139 and 140 move forwardly from the aligned position, to the over-centred position, the spacing 136 passes through a maximum stretching the fabric of the panel 92 and then tension is reduced and resilience in the container holds the links over-centred. Interferences between the links 139 and 140 eventually limits movement of the links forwardly from the over-centred position, and if desired, a supplemental coil spring means (not shown) can be provided to assist in holding the links 139 and 140 in the over-centred position serving as another reaction means.

In summary, the size and the shape of the links, the handle members and the fabric panels are selected to provide the first portion of the reaction means in which the container 22 resiliently reacts against the outwards movement of the handle members by generating the inwardly directed reaction force, and cooperates with the handle members so that when the wheelbarrow is erected, the limiting links are held or locked over-centred against the stop means by the inwards force from the reaction means. A second portion of the reaction means is described with reference to FIGS. 8 through 11.

Figure 5:
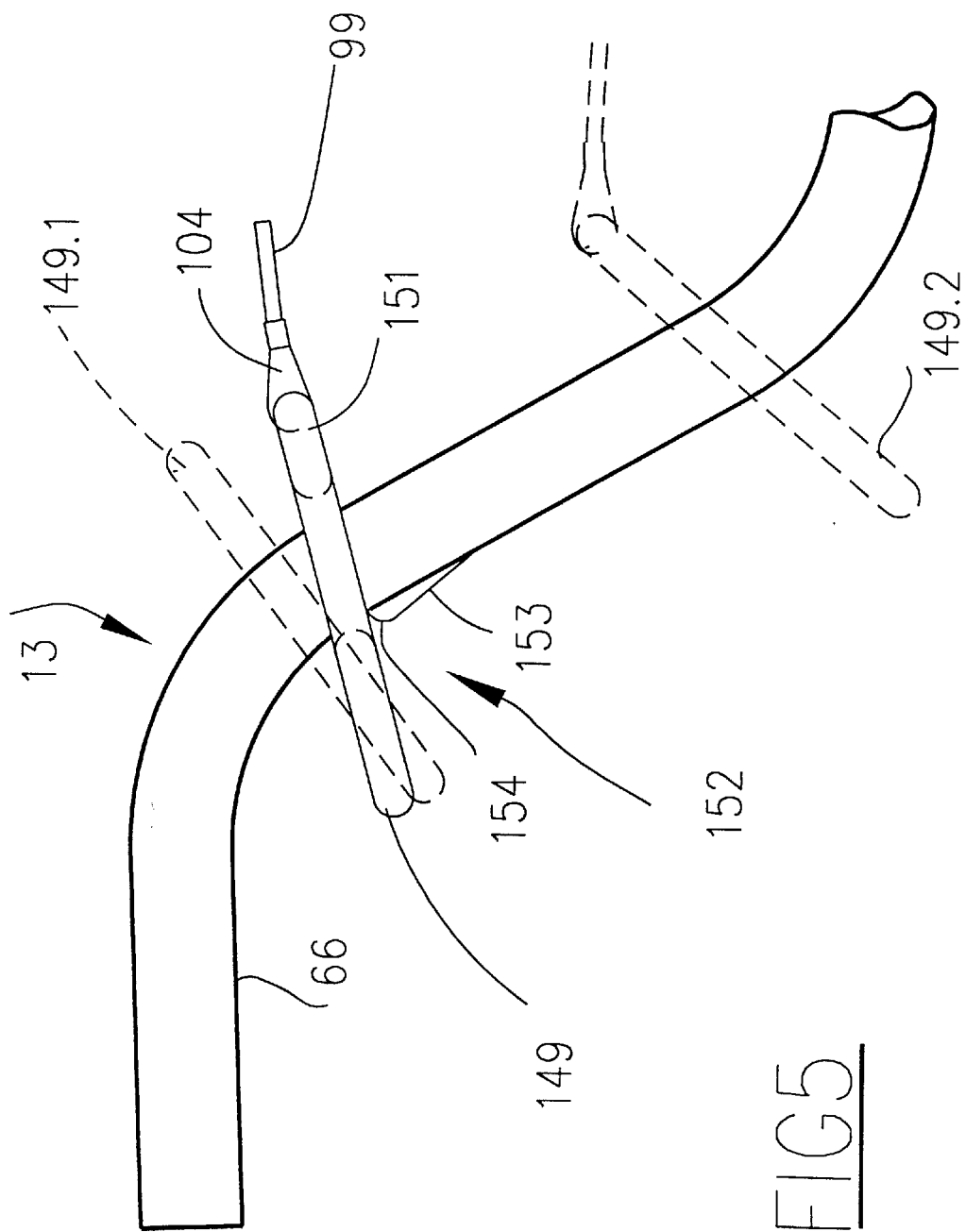
FIG. 5 is a simplified fragmented side elevation showing a releasable connection between a rear portion of the container and the frame.

FIG. 5, with Reference to FIG. 2

Rear portions of the container 22 are releasably attached to the respective handle members in an identical manner, and thus one side only is described as follows. The rear end 104 of the left hand longitudinal link portion 99 is fitted to an eye 151 of a locking ring 149 (see FIG. 2) which is a sliding fit on the handle member 13. A forward lower portion of the grip portion 65 of the handle member 13 has a catch 152 which comprises a forward ramp portion 153 blending smoothly into a lower surface of the handle member, and a rearward facing step portion 154. The space between an outermost portion of the catch 152 and a diametrically opposite side of the handle member 13 is slightly less than inside diameter of the locking ring 149. Consequently, when the locking ring is disposed within a diametrical plane passing through the step portion 154 as shown in broken outline at 149.1, the ring 149 can pass longitudinally over the catch means. However, when the ring is inclined obliquely as shown in full outline, the ring engages the step and is prevented from passing along the arm member.

The longitudinal link portion 99 has a length such that, when the frame of the wheelbarrow is fully erected and the ring 149 is positioned aft of the catch 152 against the step portion 154, there is sufficient tension in the link portion 99 to maintain position of the side panel of the container against normal forces occurring during use of the wheelbarrow. This length is selected when the handle members and leg members are at the closest spacing relative to each other, within the limits imposed by the second set of stiffening means 115, which limits excessive movement between the handle members and leg members during erection as will be described.

Thus, when the wheelbarrow is erected as shown in FIGS. 1 through 3, the ring 149 is positioned aft of and engages the step portion 154, that the link portion 99 remains tight. However, when the wheelbarrow is to be folded, as will be described with reference to FIGS. 12 and 13, the ring 149 is released from the catch means by being aligned diametrically to pass over the step portion (see the position 149.1), whereupon the ring eventually assumes a broken outline position at 149.2 in which position the link portion becomes slack which permits relative rotation of the members 13, 14, 19 and 20 about the axis 45 (see FIGS. 1 and 12).

Figure 7:
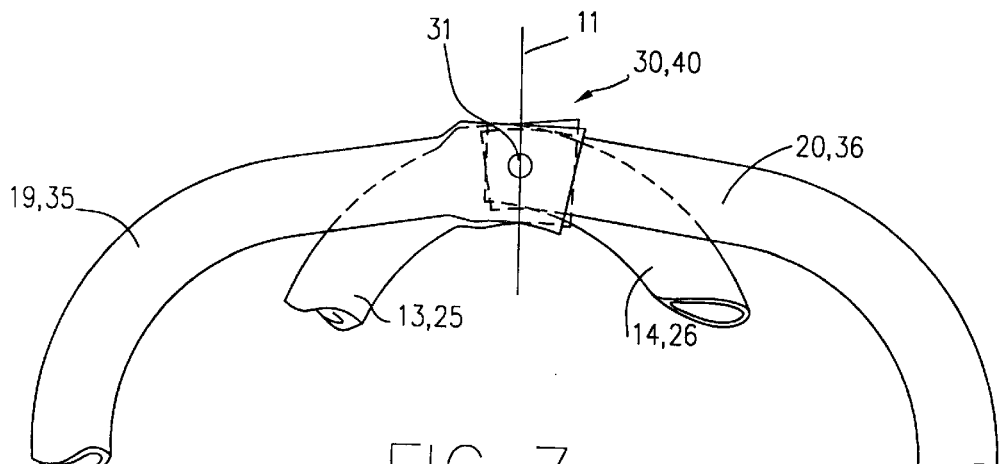
FIG. 7 is similar to FIG. 6, but showing the frame folded.
Figure 6:
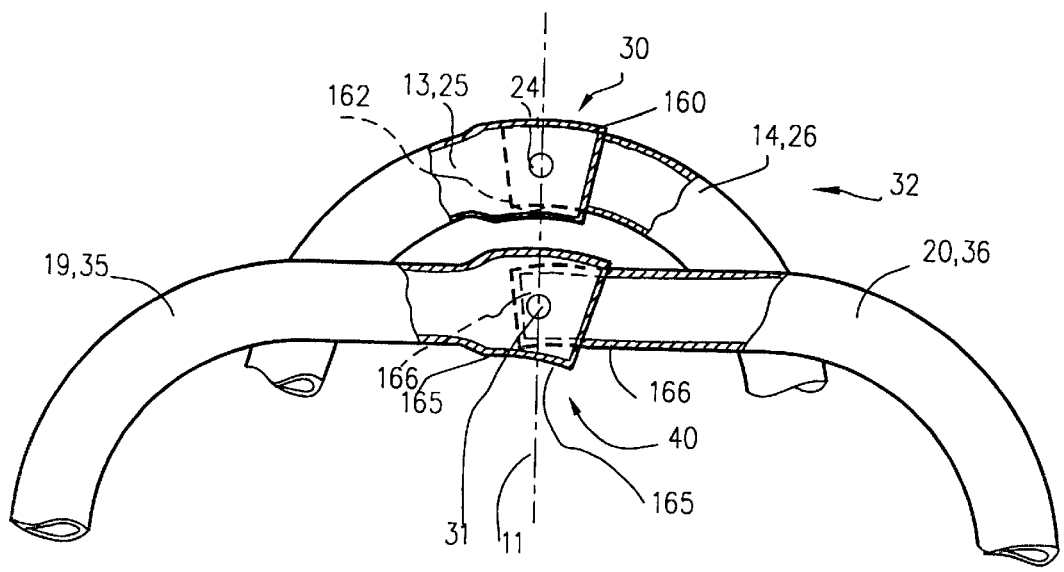
FIG. 6 is a simplified fragmented top plan showing forward portions of the frame of the invention disposed forwardly of the wheel, the frame being in an erected position.

FIGS. 6 and 7

As previously stated, the forward portions 25 and 26 are hingedly connected together by the hinge pin 24 to provide a stable connection between the two handle members 13 and 14 to provide a sufficiently rugged kicker portion 32 which can withstand loads when the operator dumps loads from the wheelbarrow. The forward portion 25 has an open end 160 which is expanded to receive an open end 162 of the forward portion 26, thus providing female and male connections of the joint 30 respectively. The open ends 160 and 162 overlap sufficiently to provide an adequate amount of wall surrounding the hinge pin 24, and if necessary, the open ends can be reinforced for additional strength. Overlapping portions of the open ends are deformed to form portions of arcs centred on the hinge pin 24 to permit sufficient relative rotation of the forward portions before interference occurs when folding the wheelbarrow as will be described.

Similarly, the forward portions 35 and 36 of the leg members 19 and 20 at the joint 40 have open ends 165 and 166 connected together by the hinge pin 31, the open end 165 being expanded to receive the end 166. The hinge pins 24 and 31 are axially aligned with each other when the wheelbarrow is folded, as shown in FIG. 7, to permit rotation about the hinge pins with negligible interference, to permit folding of the wheelbarrow as will be described with reference to FIGS. 1, 12 and 13. While the open ends 160, 162, 165 and 166 are not symmetrical about the plane 11, the hinge pins 24 and 31 have axes generally within the plane 11.

FIGS. 8 through 11

Figure 8:
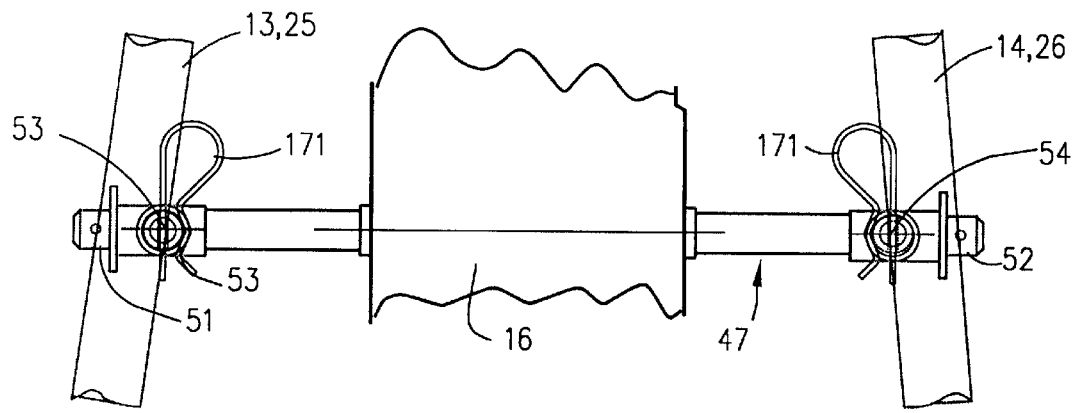
FIG. 8 is a simplified fragmented top plan of forwards portions of the frame adjacent the wheel, the frame being in an erected position.
Figure 9:
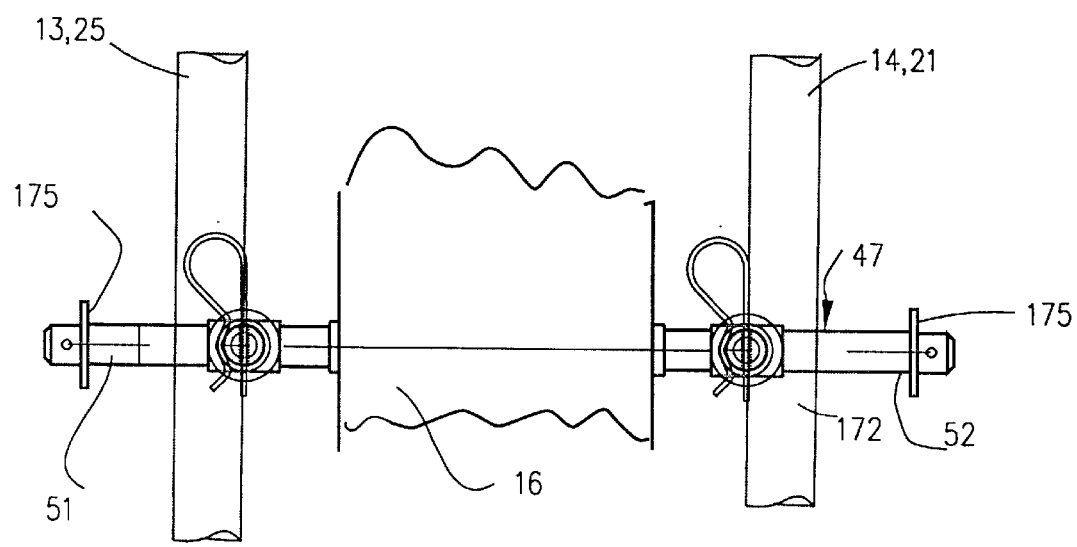
FIG. 9 is similar to FIG. 8, but showing the frame folded.
Figure 10:
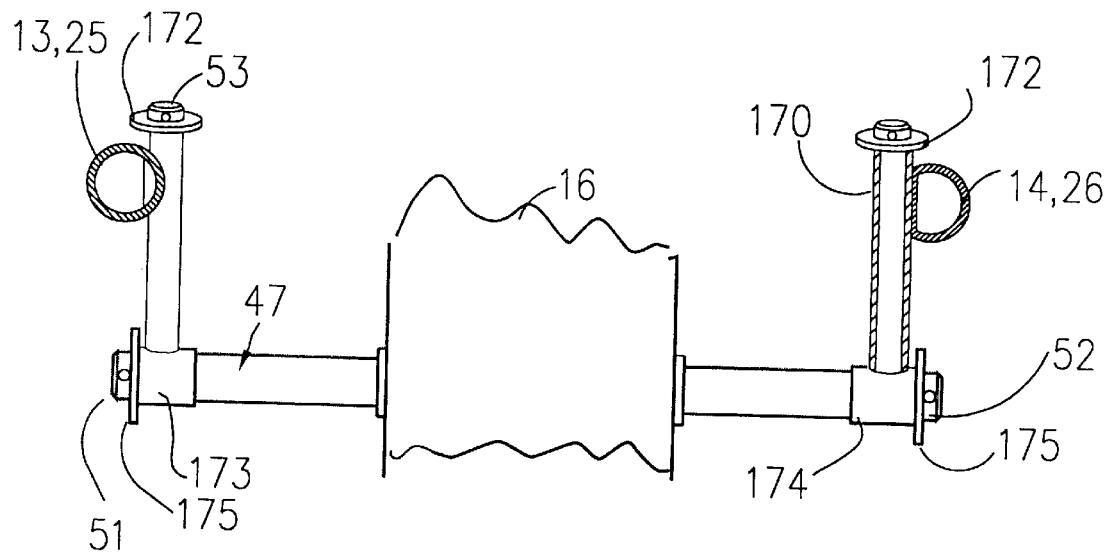
FIG. 10 is a simplified fragmented front elevation of portions of the frame adjacent the wheel, the frame being in an erected position.
Figure 11:
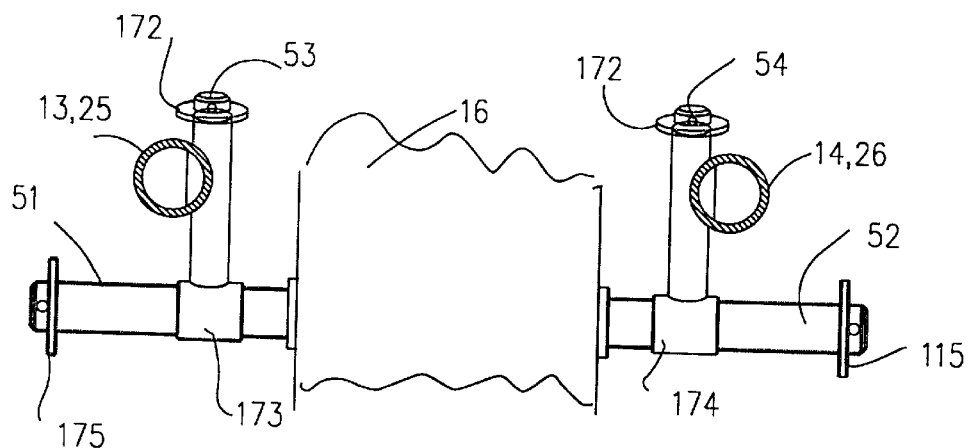
FIG. 11 is similar to FIG. 10, but showing the frame folded.

The forward portions 25 and 26 of the handle members 13 and 14 are deformed to receive generally vertical sleeves 170 welded thereto and receiving the axle supports 53 and 54, as best seen in FIG. 10. The sleeves 170 serve as bearings and vertical supports and resemble the hinge sleeves 39, which are described with reference to FIG. 14. Upper ends of the axle supports 53 and 54 have undesignated transverse openings to receive respective cotter pins 171 which cooperate with adjacent respective washers 172 to prevent the axle supports from sliding out of the sleeves 170 connected to the forward portions. Lower portions of the axle supports 53 and 54 carry axle sleeves 173 and 174 which receive the axle end portions 51 and 52 of the axle 47. The axle end portions 51 and 52 have transverse openings to receive cotter pins, not shown, which locate respective washers 175 which serve as axle end stops to prevent the axle 47 from sliding out of the axle sleeves. It is noted that the wheel 16 is journalled on the axle 47 for rotation thereabouts, and the sleeves 173 and 174 are mounted for axial sliding along the axle, and not for relative rotation thereto, assuming the journal for the wheel 16 is free to rotate. Thus, FIGS. 8 and 10 show that the forward portions 25 and 26 and the sleeves 173 and 174 are located adjacent the washers 175 at the axle end portions when the forward portions are at their widest setting when the wheelbarrow is erected. In contrast, in FIGS. 9 and 11, the forward portions 25 and 26 and sleeves 173 and 174 are located at a narrower setting when the wheelbarrow is folded as will be described.

A second portion of the reaction means comprises a difference in size between length of the axle 47 and maximum spacing between the handle members 13 and 14 as follows. When the wheelbarrow is being erected, the axle sleeves contact the washers 175 before the limiting means 134 (FIG. 2) over-centres, and thus portions of the handle members adjacent the washers are restrained adjacent further outwards movement against the washers 175 when the limiting means is finally over-centred. Thus, the members 13 and 14 are resiliently deflected and strained somewhat which augments resilience in the bottom panel to further assist in maintaining the limiting means latched in the extended position. Thus, the second portion of the reaction means comprises limiting links 139 and 140, axle stops of the wheel axle 47 and the handle members 13 and 14 being sized and shaped to interfere with each other before the limiting links pass through the generally aligned intermediate position thereof, so that further opening of the handle members to a fully erected position results in interference with the axle stops and slight resilient bending of the handle members which generate an inwardly directed resilient or spring force as a reaction to the limiting means.

FIG. 12

When the wheelbarrow is fully erected as shown in full outline, the lower hinge joint 30 is shown disposed forwardly of the upper hinge joint 40, whereas when the wheelbarrow is folded as shown in broken outline, the joint 40 is shown located generally vertically above the joint 30. When the wheelbarrow is erected, the hinge pins 43 and 44 are transversely aligned with each other, and when collapsed as shown in broken outline, the hinge pins are non-aligned. Similarly, the axle supports 53 and 54 are shown wide apart in full outline when the wheelbarrow is erected, and closer together at 53.1 and 54.1 when the wheelbarrow is collapsed.

FIG. 14

The intermediate portions 61 and 71 of the handle member 13 and leg member 19 respectively are each formed with a transverse groove 189 extending thereacross, each groove having a generally semicircular cross section complementary to about half of the outer surface of the sleeve 39. Thus, the groove has a radius generally equal to the outer radius of the sleeve 39, and each sleeve is welded with a bead 190 to secure the sleeve to the appropriate member. Thus, the welded sleeve provides a secure connection to resist forces and to journal the hinge pin 43. Washers 193 are located adjacent outer ends of the sleeves 39 and are retained in place by cotter pins, not shown, passing through transverse openings 195.

As indicated earlier, the sleeves 170 adjacent the axle provide similar bearings for the axle supports 53 and 54 adjacent the forward portions 25 and 26 of the handle members.

OPERATION

Figure 12:
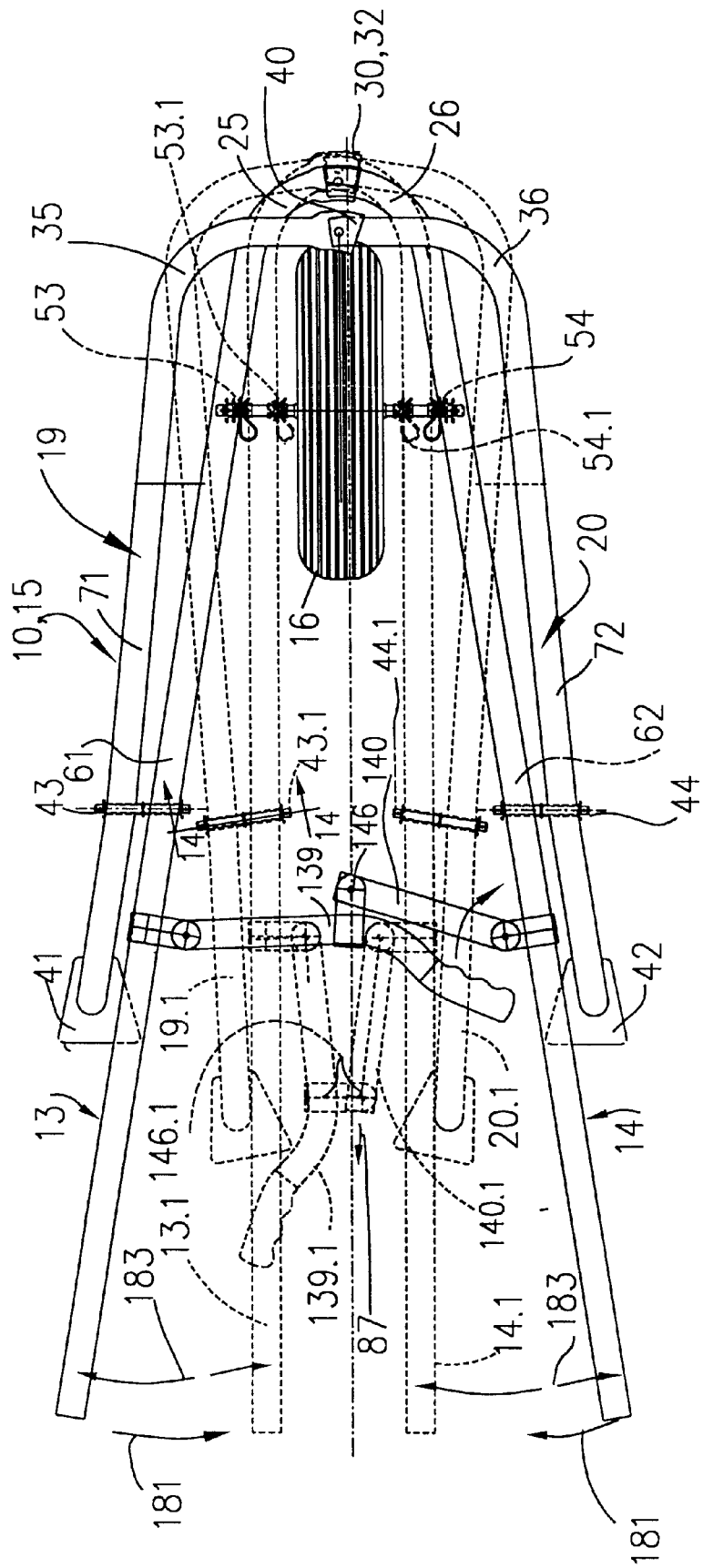
FIG. 12 is a simplified top plan of the invention with the frame being shown in full outline in the erected position, and in broken outline in the fully folded position, the flexible container being removed.
Figure 13:
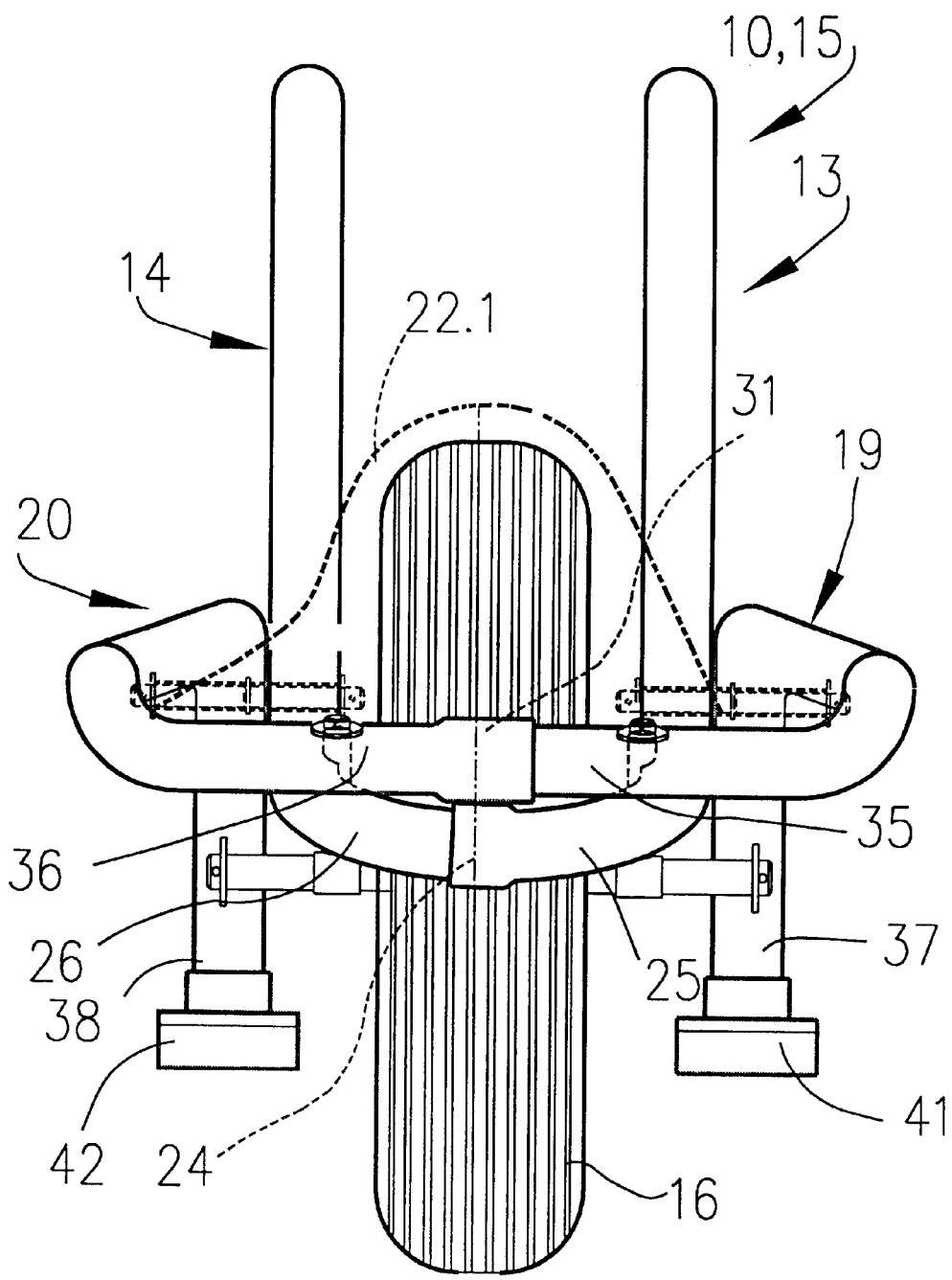
FIG. 13 is a simplified front elevation of the invention with the flexible container removed, showing the frame folded.
Figure 14:
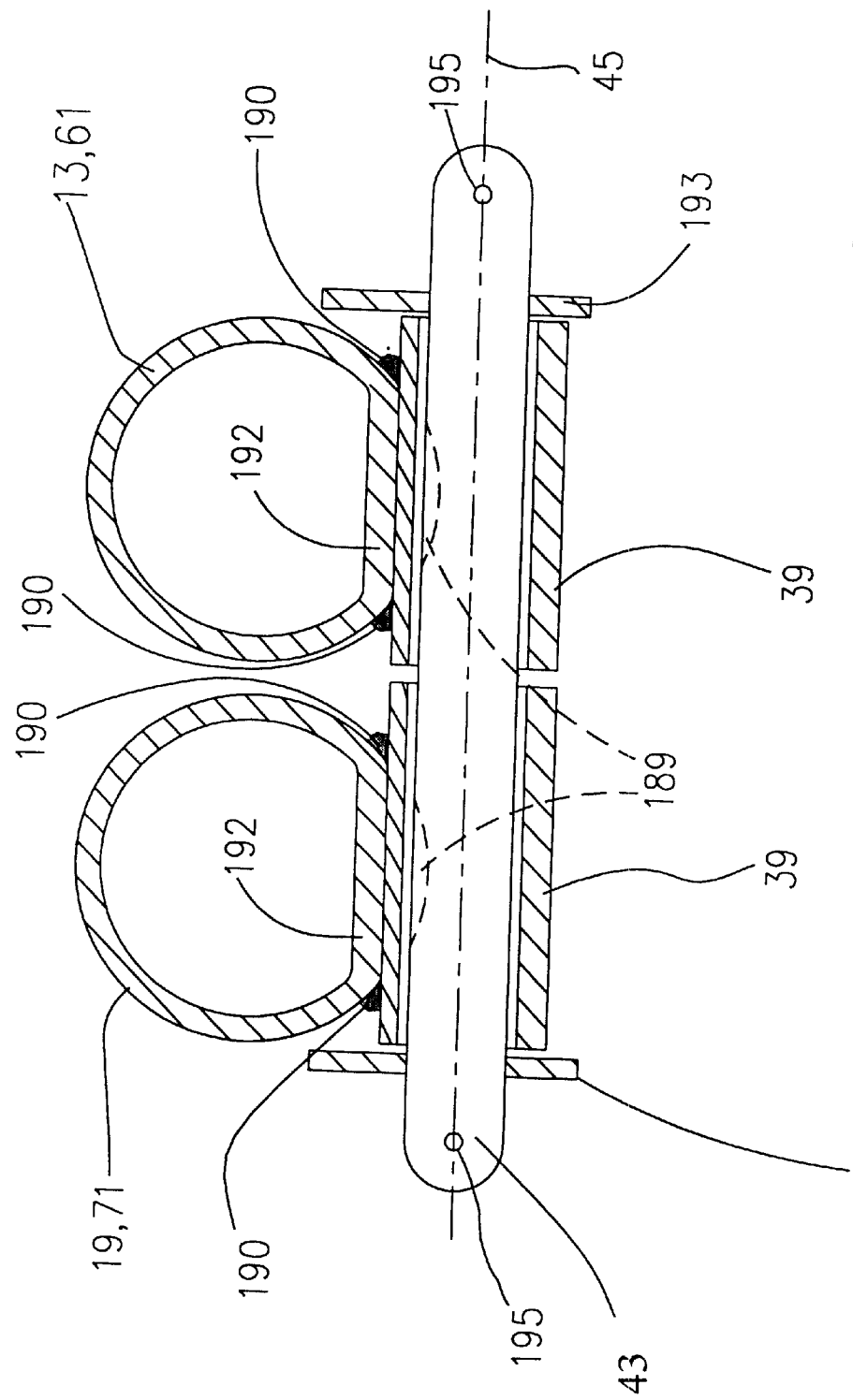
FIG. 14 is a simplified fragmented section of a main hinge, as seen generally on line 14—14 of FIG. 12.

FIGS. 1, 12 and 13

As previously described with reference to FIG. 1, when the wheelbarrow is erected intermediate portions of the handle members 13 and 14 are disposed at the angle 76 (about 35 degrees) to the leg members 19 and 20 and are held in place by tension in the link portions 99 and 100. Prior to folding the wheelbarrow from the erected position thereof, each locking ring 149 is released from the respective catch 152 so as to move downwardly to attain the position 149.2 as shown in FIG. 5. The wheelbarrow is then partly collapsed by rotating the members about the hinge pins 43 and 44, so that the members swing towards each other as shown in FIG. 1 to attain the angle 77 which is considerably less, i.e. about 3 degrees.

As seen in FIG. 12, the handle members and leg members are preferably rotated about the hinge pins when the wheelbarrow is extended, as the hinge pins are aligned with each other, thus reducing interference during rotation. During or after this initial folding, the limiting means 134 can be released by moving the handle 142 outwardly. The handle members 13 and 14 can then be gripped and moved inwardly per arrows 181 so as to rotate about the hinge pin 24, while the leg members 19 and 20 concurrently rotate about the hinge pin 31. As the handle members 13 and 14 and the leg members 19 and 20 move inwardly towards each other per arrows 181, the axle sleeves 173 and 174 slide inwardly along the axle 47 to attain a position as shown in FIG. 13. During this folding, the fabric of the container 22 is manipulated to position it so that the wheel 16 displaces the fabric of the forward panel 89 and bottom panel 92 upwardly to permit the forward portions 25 and 26 and 35 and 36 to approach each other and contact each other as shown in FIG. 13, with a displaced bottom portion of the container being shown in broken outline at 22.1 enclosing an upper periphery of the wheel 16. This is possible due to the fabric fullness provided in the container due to the broad flap portions 114 of the bottom corner connectors 111 and 112.

Referring to FIG. 12, the left hand and right hand handle members are shown in full lines in positions representing the wheelbarrow in a fully erected position, and correspond to the position as shown in FIGS. 1 and 2. The members 13 and 14 are also shown in broken outline at 13.1 and 14.1 in fully folded positions, each having rotated through angles 183 about the joint 30 and correspond to the position shown in FIG. 13. In the fully folded positions, the intermediate portions 61 and 62 of the handle members are essentially parallel to each other and disposed generally perpendicularly to the wheel axis 47. In the folded position, the limiting links 139 and 140 have swung from the over-centred position in FIG. 2 rearwardly about the respective outer ends thereof to respective inclined retracted positions 139.1 and 140.1 in which the link hinge 146 has moved aft in direction of an arrow 187 to position 146.1. Clearly, because the leg members 19 and 20 are permanently connected to the handle members at the hinge pins 43 and 44, while the handle members move inwardly the leg members similarly move inwardly to attain the positions 19.1 and 20.1 as shown in broken outline in FIG. 12 having rotated about the upper hinge joint 40.

In the folded position, the wheelbarrow can be stored easily, for example by hanging against a wall with the wheel at a lowermost position. When folded, the wheelbarrow can be carried easily in the back of a medium-sized station wagon, or in a lockable transverse cargo box of a light pick-up truck, or several can be carried on the back of a pick-up truck.

To re-erect the wheelbarrow from the folded position of FIG. 13, the folded wheelbarrow is first placed on the ground with the foot pads 41 and 42 and the wheel supporting the folded wheelbarrow. The handle members are gripped and rotated first about the lower hinge joint 30 so as to move the handle members and leg members outwardly to attain the full outline positions. Simultaneously, the limiting links 139 and 140 approach an aligned position as the link hinge 146 moves forwardly towards the wheel 16. As the limiting links approach the aligned position, the operator pushes the handle 142 to apply a light forward force thereagainst which is sufficient to over-centre the link hinge by moving it past the aligned position against resistance from the reaction means. As previously described with reference to FIG. 3, the reaction means include the said additional tension in the bottom panel of the container and the said interference between the axle stops and the handle members. As the limiting links pass the aligned position, they "snap" into the locked forward position as shown in FIG. 12 against each other and remain in that position under reaction forces from resilience in the handle members and/or resilience in the bottom portion of the container.

The operator then grips the two grip portions 65 and 66, and places his foot on the one of the foot pads 41 or 42 to restrain the leg members in a relatively lowered position. The operator then pulls upwardly on the grip portions, swinging the handle members upwardly by rotating the members relative to the leg members, and simultaneously raising the main hinge axis 45 so that forward portions of the leg members also move upwardly while the handle members rotate about the hinge pins 43 and 44. When the link portions 117, 118, 123 and 124 of the second set 115 become taut, the handle members and leg members are fully separated and disposed at the angle 76 (FIG. 1). The locking ring 149 on each handle member is then slid along the handle member until it passes over the catch 152, thus resiliently deflecting the handle members slightly which applies tension to the longitudinal link portions 99 and 100 and effectively augments stiffening of the frame against further rotation about the axis 45. Tension in the link portions 99 and 100 also stiffens side panels of the container. In the erected position, the link portions 117, 118, 119 and 120 of the second set of stiffening means 115 are held under tension due to tension in the link portions 99 and 100.

As seen in FIG. 12, in the folded position the hinge pins are not aligned with each other, and thus attempting to erect the wheelbarrow in a different sequence to that described above can present problems if the frame is relatively new and there is little wear in the hinge pins. In other words, if an operator tries to erect the wheelbarrow by first rotating the arm members and leg members about the hinge pins 43 and 44, the frame 16 and/or the fabric can be strained as the hinge pins are not aligned. However, if tolerances between these hinge sleeves and the hinge pins are relatively large to provide sufficient lost motion or play in the hinges, and there is sufficient looseness in the fabric container, the sequence of erection can be reversed so that the handle members and arm members can first be separated vertically, before separating them horizontally as described above. While the erection and folding are described in two specific manipulations performed in sequence, the manipulations can occur essentially simultaneously provided undue force is not required.

In summary, it can be seen that the first set of flexible tension links 97 cooperates with the handle members and the leg members to limit rotational movement therebetween so to prevent any decrease of the angle 76 therebetween, and the second set of flexible tension links 115 prevent any increase in the angle 76. Thus, the handle members and leg members are locked in fixed positions by opposing forces generated by the flexible tension links to prevent inadvertent relative rotation about the main axis 45. Similarly, the limiting means 134 and the reaction means prevent inadvertent rotation of the handle members and leg members about the lower and upper hinge joints 30 and 40 and thus also contribute to a rigid space frame. Clearly, the handle members and leg members are held in the erected position under several different forces acting in opposition to each other which resist unintentional folding of the wheelbarrow. If the lengths of the link portions are selected accurately so that all the flexible link portions are under sufficient tension that further relative movement requires excessively high forces, the resulting frame is a pre-tensioned, lightweight space frame which can resists forces from many directions and still maintain integrity when erected. If tension in one or more of the flexible link portions is insufficient, relative movement can develop between the handle and/or leg members when the wheelbarrow is loaded, which can impose excessive forces on portions of the structure, resulting in possible damage or release of an end of one or more link portions. Clearly, use of flexible tension links provides a light weight and strong stiffening means for the hinged frame, and no separate connectors are required for erection or folding. Most ends of the links remain fixed to the particular member, with the exception of the rear ends of the longitudinal links which have a releasable sliding connection with the catch 152 on the rear portions of the handle members.

What is claimed is:

1. A folding wheelbarrow which is adjustable between erected and folded positions, the wheelbarrow comprising:
   (a) a pair of handle members having respective forward and rear portions, the forward portions being pivotally connected and cooperating with each other to form a kicker portion when the wheelbarrow is erected, and the rear portions being laterally spaced apart when the wheelbarrow is erected for gripping by the hands of a user,
   (b) a pair of leg members having forward and rear portions, the forward portions of the leg members being pivotally connected and cooperating with each other and being located generally above the forward portions of the handle members when the wheelbarrow is erected, and the rear portions of the leg members providing a pair of laterally spaced apart legs to support the erected wheelbarrow, each leg member, being hinged to an adjacent handle member for rotation about a respective main hinge axis, the forward portions of the handle members and the forward portions of the leg members being spaced apart when in the erected position and being positioned together when in the folded position,
   (c) a wheel mounted for rotation about a transversely extending wheel axle, the axle being attached to the pair of handle members and extending therebetween, the wheel being located adjacent to and rearwardly of the kicker portion, and
   (d) a collapsible container made of a flexible sheet material, the container being located between the forward portions of the leg members and the rear portions of the handle members when erected, the pair of handle members and the pair of leg members extending substantially parallel to each other with the wheel therebetween when in the folded position and diverging outwardly when pivoted to the erected position.

2. A wheelbarrow as claimed in claim 1, further comprising:
   (a) stiffening means for stiffening the wheelbarrow when erected, the stiffening means extending between the handle members and the leg members to limit relative movement therebetween.

3. A wheelbarrow as claimed in claim 2, in which the stiffening means comprises:
   (a) a first set of flexible tension links which extend longitudinally between the rear portions of the handle members and the front portions of the leg members on each side of wheelbarrow.

4. A wheelbarrow as claimed in claim 2, in which the stiffening means comprises:
   (a) a second set of flexible tension links which extend diagonally and transversely between the handle members and the leg members on opposite sides of the wheelbarrow.

5. A wheelbarrow as claimed in claim 3, in which:
   (a) the container has an upper rim, and
   (b) the first set of flexible tension link cooperates with portions of the rim of the container to support the rim against deflection.

6. A wheelbarrow as claimed in claim 1, in which:
   (a) the forward portions of the handle members are hingedly connected together for rotation about a lower hinge joint and to form the kicker portion.

7. A wheelbarrow as claimed in claim 6, in which:
   (a) the forward portions of the leg members are hingedly connected together for rotation about an upper hinge joint, the upper hinge joint having a hinge pin, and
   (b) the lower hinge joint has a hinge pin which is generally aligned with the hinge pin of the upper hinge joint when the wheelbarrow is folded.

8. A wheelbarrow as claimed in claim 1, in which:
   (a) the main hinge axes are disposed transversely of the wheelbarrow and axially aligned with each other when the wheelbarrow is erected.

9. A wheelbarrow as claimed in claim 1, in which:
   (a) the axle of the wheel hingedly and slidably cooperates with the forward portions of respective handle members to permit relative movement between each handle member and the axle.

10. A wheelbarrow as claimed in claim 9, further comprising:
    (a) an axle support extending from each end portion of the axle to cooperate with the forward portions of the handle members, the axle supports being disposed parallel to each other when viewed longitudinally of the wheelbarrow, and also being disposed generally within an axle plane which is disposed generally perpendicularly to the forward portions of the handle members.

11. A wheelbarrow as claimed in claim 1, in which:
    (a) the axle supports carry axle sleeves which slidably receive end portions of the wheel axle therein to permit lateral movement of the forward portions of the handle members relative to the axle.

12. A wheelbarrow as claimed in claim 1, in which:
    (a) each handle member comprises an intermediate portion disposed between the forward and rear portions thereof, the intermediate portions and the forward portions of the handle members being within a first plane of the handle members,
    (b) each leg member comprises an intermediate portion disposed between the forward and rear portions thereof, the intermediate portions and the forward portions of the leg members being disposed within a second plane of the leg members, and
    (c) the intermediate portions of each leg member and the adjacent handle member are hinged together at the said main hinge axis for rotation relative to each other, so that an angle of inclination between the said first plane and the said second plane varies from between approximately 35 degrees when the wheelbarrow is erected, to approximately 3 degrees, when the wheelbarrow is folded.

13. A wheelbarrow as claimed in claim 12, in which:
    (a) the rear portion of each handle member is formed into an approximate crank shape to provide a respective grip portion, the grip portions being disposed within a grip plane which is located above the first plane,
    (b) the rear portion of each leg member is formed into a shallow L-shape to provide a downwardly extending foot portion, the foot portions being disposed within a foot plane extending beneath the second plane and being generally perpendicular to the grip plane, and
    (c) the grip portions and the foot portions on each side are located within generally vertical planes when the wheelbarrow is viewed axially.

14. A wheelbarrow as claimed in claim 1, further comprising:
    (a) limiting means for limiting outwards movement of the handle members so as to limit maximum spacing between the handle members when the wheelbarrow is erected.

15. A wheelbarrow as claimed in claim 14, in which the limiting means comprises:

(a) a pair of limiting links having outer ends hinged to the handle members, and being hinged together about a link hinge disposed generally on a longitudinal axis of the wheelbarrow, the limiting links having a length such that, while the wheelbarrow is being erected from the folded position, the handle members move outwardly away from each other and the limiting links pass through an aligned position representing maximum spacing between the handle members and then attain an over-centred position, at which the handle members are a smaller spacing apart.

16. A wheelbarrow as claimed in claim 15, further comprising:

(a) reaction means to react against said outwards movement of the handle members, the reaction means cooperating with the handle members to generate an inwardly directed reaction force on the limiting means so that when the wheelbarrow is erected, the limiting means are locked in the over-centred position against movement by the inwardly directed reaction force from the reaction means.

17. A wheelbarrow as claimed in claim 16, in which the reaction means comprises:

(a) the forward portions of the handle members are hingedly connected together for inwards and outwards rotation about a lower hinge joint and to form the kicker portion, and (b) the axle has axle end stops to interfere with outwards rotation movement of the handle members, the axle end stops being located so that structure movable with the forward portions of the handle members interferes with the axle end stops before the limiting means are locked, so that further opening of the handle members to fully erected positions thereof to lock the limiting means results in resilient bending of the handle members against a reaction force from the axle end stops.

18. A wheel barrow as claimed in claim 16, in which the reaction means comprises:

(a) the container having a bottom panel with oppositely located bottom corner connectors cooperating with adjacent handle members, spacing between the oppositely located bottom corner connectors being less than spacing between the handle members when fully opened so that the bottom panel is taut when the limiting links are over-centred, the bottom panel of the container being subjected to additional tension as the limiting links pass through the aligned position to attain the over-centred position, in which resilience in the container holds the limiting links in the over-centred position and maintains the handle members in the erected positions thereof.

19. A wheelbarrow as claimed in claim 18, in which:

(a) the bottom corner connectors are wider adjacent a rear portion of the container than a front portion of the container to provide sufficient fullness of material in the container to facilitate folding of the wheelbarrow.

20. A wheelbarrow as claimed in claim 1, in which the collapsible container comprises:

(a) a pair of side panels and forward and rear panels having respective upper, lower and side edges, in which the side edges of the adjacent panels are secured together at corners of the container, and the upper edges of the side panels having sleeves to provide upper rims of the side panels, (b) a bottom panel interconnecting the lower edges of the side panels and the forward and rear panels to form a bottom portion of the container, and a pair of oppositely located bottom corner connectors extending from the bottom portion and being connected to the handle members to restrict relative movement between the container and the handle members, and (c) a flexible tension link means passing through each sleeve of the wheelbarrow to extend between a handle member and a leg member on the said side of the wheelbarrow thus stiffening the upper rims of the side panels.

\* \* \* \* \*